United States Patent
Johnson et al.

(10) Patent No.: US 7,028,219 B2
(45) Date of Patent: Apr. 11, 2006

(54) HYBRID METHOD FOR FLUSHING TRANSACTION STATE IN A FAULT-TOLERANT CLUSTERED DATABASE

(75) Inventors: Charles Stuart Johnson, San Jose, CA (US); David J. Wisler, Tigard, OR (US); Trina R. Wisler, Tigard, OR (US); William James Carley, Woodinville, WA (US); Yu-Cheung Cheung, San Jose, CA (US); Albert Gondi, Santa Clara, CA (US); Sitaram V. Lanka, Mercer Island, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 604 days.

(21) Appl. No.: 10/302,627

(22) Filed: Nov. 21, 2002

(65) Prior Publication Data

US 2003/0204771 A1 Oct. 30, 2003

Related U.S. Application Data

(60) Provisional application No. 60/375,703, filed on Apr. 25, 2002.

(51) Int. Cl.
*G06F 11/00* (2006.01)

(52) U.S. Cl. .............................. 714/15; 714/16; 707/8; 707/202

(58) Field of Classification Search ................ 714/15, 714/16; 718/101; 707/202, 8
See application file for complete search history.

(56) References Cited

U.S. PATENT DOCUMENTS

| 6,105,147 | A  | * | 8/2000  | Molloy .......................... 714/16 |
| 6,266,698 | B1 | * | 7/2001  | Klein et al. ................. 709/227 |
| 6,363,401 | B1 | * | 3/2002  | Yahya et al. ................ 707/202 |
| 6,463,456 | B1 | * | 10/2002 | Kan et al. .................... 709/201 |
| 6,493,726 | B1 | * | 12/2002 | Ganesh et al. .............. 707/201 |
| 6,687,849 | B1 | * | 2/2004  | Cherf ............................ 714/5 |
| 6,728,958 | B1 | * | 4/2004  | Klein et al. ................. 718/101 |
| 6,738,971 | B1 | * | 5/2004  | Chandrasekaran et al. .. 718/100 |

* cited by examiner

*Primary Examiner*—Robert Beausoliel
*Assistant Examiner*—Marc Duncan

(57) ABSTRACT

A Registration protocol is used in transaction processing for normal operations. If an error occurs, the system reverts to a Full Broadcast protocol. The Registration Protocol reduces the number of messages that are sent among CPUs in a cluster thereby permitting performance improvements in the system. The Registration Protocol has Begin, DP2 Check, Phase 1 Flush and Phase 2 (lock release) phases just as does the Full Broadcast Protocol, thereby permitting the Full Broadcast protocol to step in at any phase after an error is detected.

22 Claims, 12 Drawing Sheets

HYBRID METHOD FOR FLUSHING TRANSACTION STATE IN A FAULT-TOLERANT CLUSTERED DATABASE

CROSS-REFERENCE TO RELATED APPLICATIONS

This application is related to U.S. Application, entitled "METHOD FOR HANDLING CLUSTER FAILURES AND RELOADS IN A FAULT TOLERANT CLUSTERED DATABASE SUPPORTING TRANSACTION REGISTRATION AND FAULT-IN LOGIC", filed Nov. 21, 2002, Ser. No. 10/302,628.

This application claims priority to U.S. provisional application, entitled "HYBRID METHOD FOR FLUSHING TRANSACTION STATE IN A FAULT-TOLERANT CLUSTERED DATABASE", filed on Apr. 25, 2002, Ser. No. 60/375,703, which is incorporated by reference into the present document.

FIELD OF THE INVENTION

The present invention relates generally to improving performance of transaction processing systems, and more particularly to improving the efficiency of distributed transaction protocols so that performance is maintained or improved as the number of CPUs in the transaction processing system increases.

DESCRIPTION OF THE RELATED ART

Current transaction processing systems involve networks that interconnects clusters of clusters, each cluster being composed of a set of interconnected CPUs. These networks are called cluster interconnects or external fabrics and permit large numbers, perhaps hundreds, of CPUs to cooperate in accordance with a distributed transaction processing protocol. As the number of clusters connected by the cluster interconnect increases, however, performance problems with respect to the protocols used by the entire transaction processing system begin to occur, especially when the size of the transaction is small. In particular, certain protocols used to end a transaction (a transaction flush) are multicasts that affect each CPU whether or not that CPU was involved in the transaction. The transaction flush multicasts thus create a large number of messages over the cluster interconnect, which, for large numbers of small transactions, tends to excessively load the cluster interconnect. In other parts of the protocol, messages between CPUs are inefficient and not effectively aggregated due to the arrival pattern of transaction flushes and the distribution of transaction operations.

Historically, systems that send large numbers of small messages suffer from two kinds of performance limiting effects: (a) network communications messaging overhead and (b) hotspots in processing when there is much (i) fan-out or (ii)fan-in.

Network communications overhead comes from the serialization, synchronization, data integrity, routing, error handling and flow control requirements placed on communications systems, and these are standard issues, standardly handled. It is in the per-message handling costs that box-carring becomes a performance win, with a diminishing return for each additional box-carred message which is sent together with others, amortizing that overhead over the group.

Hotspots in processing occur when there is high traffic, either by protocol design, or by an unexpected load imbalance, which originates from a particular CPU and fans-out to many CPUs in the cluster, or which originates from many CPUs and fans-in to a single CPU in the cluster. Both of these conditions will occur, due to protocol, when coordination or synchronization are required in fault-tolerant systems, by the very nature of those systems.

Thus, there is a need to improve the message traffic inherent in the transaction processing protocols so that the transaction processing system can scale to larger systems without impeding the performance of the system.

BRIEF SUMMARY OF THE INVENTION

The present invention is directed towards the above need. A method in accordance with the present invention includes a method of performing a transaction in a processing cluster that has a plurality of CPUs. One of the CPUs hosts a transaction monitor. At least one CPU hosts a resource manager and each of the CPUs includes volatile storage and has access to stable storage. The method includes the steps of beginning a transaction by the transaction monitor and then performing the following steps if no CPU failure occurs: (i) registering one or more resource managers to participate in the transaction, where the CPUs that host the participating resource managers are participating CPUs; (ii) performing work required by the transaction by the one or more participating resource managers, including obtaining any locks needed by the transaction; (iii) upon completion of the transaction work by the participating resource managers, performing a phase 1 operation in which a flush request is broadcast to each participating CPU, where the flush request instructs each participating CPU to send a response indicating that information in volatile storage is flushed to stable storage; (iv) upon completion of the phase 1 operation, requesting a phase 2 operation by broadcasting a lock-release request to each participating CPU, except the CPU hosting the transaction monitor; (v) releasing any locks acquired for the transaction while performing work required by the transaction in response to the phase 2 request; and (vi) after releasing all locks acquired for the transaction, informing the transaction monitor's CPU that phase 2 is completed, and that the transaction's locks can be released there.

If at a particular step in the above method, a failure of a CPU occurs, then the processing cluster resorts to some or all of the following steps, depending on where the failure occurs: (i) broadcasting a begin transaction message to all CPUs, except the CPU hosting the transaction monitor; (ii) performing work required by the transaction by the one or more resource managers working on behalf of the transaction, including obtaining any locks needed by the transaction; (iii) upon completion of the transaction work by the resource managers working on behalf of the transaction, performing a phase 1 operation in which a flush request is broadcast to each CPU, the flush request instructing each CPU working on behalf of the transaction to send a response indicating that information in volatile storage is flushed to stable storage and instructing CPUs not working on behalf of the transaction to so indicate; (iv) upon completion of the phase I operation, requesting a phase 2 operation in which a release-lock request is broadcast to each CPU, except the CPU hosting the transaction monitor; (v) releasing any locks acquired for the transaction while performing work required by the transaction; and (vi) after releasing all locks acquired for the transaction, informing the transaction monitor's CPU that phase 2 is completed, and that the transaction's locks can be released there.

For example, if a failure occurs during the registration step, then all of the above steps are performed. If the failure occurs during the phase 2 step, then steps (iv) through (vi) are performed.

One advantage of the present invention is that the performance of a transaction system is improved when the transaction system includes a large number of clusters connected by an external fabric. In particular, the number of clusters that participate in a distributed transaction can be doubled without a significant effect on performance.

Another advantage of the present invention is that network messages between clusters are made more efficient.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
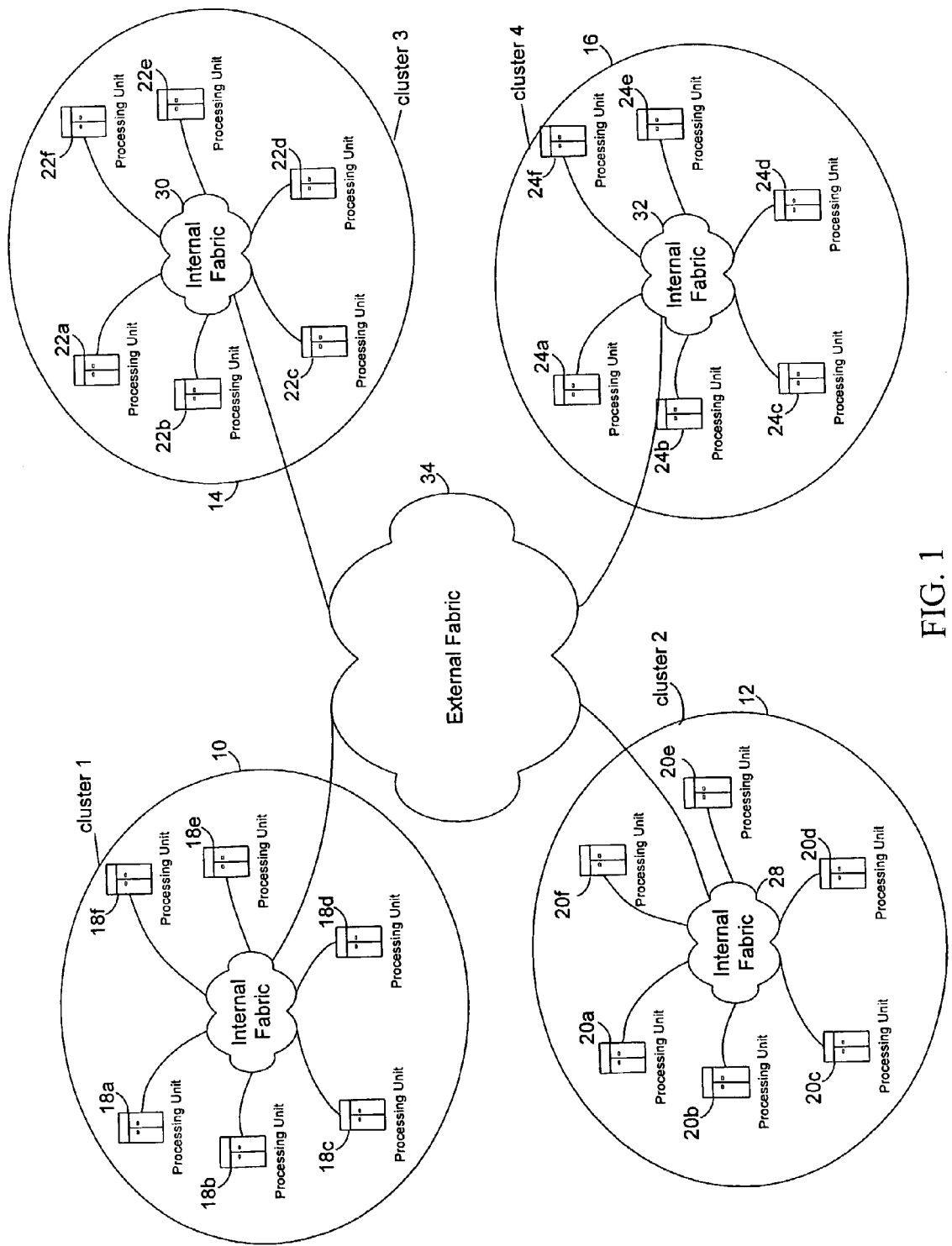
FIG. 1 shows a system setting in which the present invention operates.

FIG. 1 shows a system setting in which the present invention operates. The system includes one or more clusters 10, 12, 14, 16 of CPUs 18*a–f*, 20*a–f*, 22*a–f*, 24*a–f*, interconnected by an internal fabric 26, 28, 30, 32. In some embodiments, up to 16 CPUs (CPUs and volatile storage, such as semiconductor memory) are interconnected locally by the internal fabric. Each CPU 18*a–f*, 20*a–f*, 22*a–f*, 24*a–f* has access to a stable storage system, such as a disk system (no shown), which survives a failure in one of the CPUs. An external fabric 34 interconnects the clusters 10, 12, 14, 16. The external fabric 34 can be a local-area network or a wide-area network.

Figure 2:
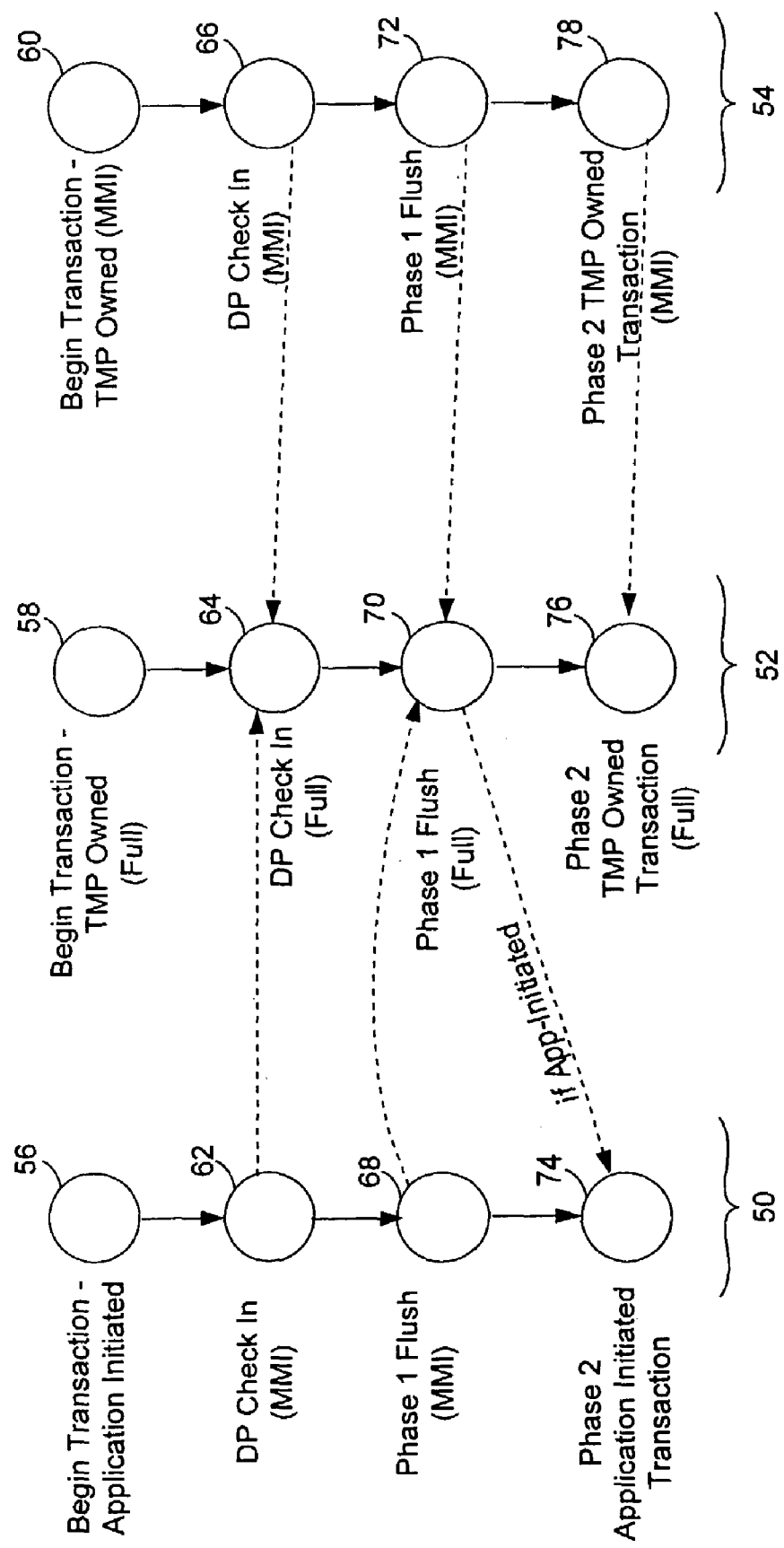
FIG. 2 sets forth the various phases of the transaction protocols involved in the present invention and their interrelationship.

FIG. 2 sets forth the various phases of the transaction protocols involved in the present invention and their interrelationships. These transaction phases are the phases involved in the life of a transaction within a cluster and may be part of a two-phase commit protocol that operates among two or more clusters.

A transaction is begun either by an Application process (Application-Initiated) 56 or by a TMP Owner 58, 60. A TMP Owner, in the usual case, is a process to which an Application process has exported a transaction. A TMP Owner can begin a transaction according to the Full Broadcast Protocol (Full) 52 or the Registration Protocol (MMI) 54. After a transaction is begun, a resource manager check-in phase 62, 64, 66 (also referred to as a DP Check-In phase) follows. Work required by the transaction is accomplished and upon completion, a Phase 1 Flush 68, 70, 72 is initiated to end the transaction. There are two kinds of Phase 1 Flush operations, one 70 in accordance with the Full protocol and one 72 in accordance with the MMI protocol. Following the Phase 1 flush, there is a Phase 2 operation 74, 76, 78, which releases locks and allows resources to be made available to users, because the transaction is completed. A Phase 2 phase is begun by the BOwner, which is either the TMP-owner or the Application process. The TMP Owner may either perform a Phase 2 flush according to the Full or MMI protocol.

FIG. 2 also sets forth the overall flow of these various phases. The normal or preferred flow of phases is from an Application- or TMP Owner-begun transaction 56, 58, 60 to a DP Check-In phase 62, 66 according to the MMI protocol, to a Phase 1 Flush 68, 72 with the MMI protocol to the Phase 2 phase 74, 78 by the Application or the TMP Owner in accordance with MMI. If however, a failure (of a CPU) occurs during the performance of the transaction, then flow is permanently transferred to the Full protocol 52, as indicated by the dotted connections.

A resource manager (DP) Check In phase 64, according to the Full protocol, occurs if there is a failure in the MMI protocol Check In phase 62, 66. A Phase 1 Flush 70 according to the Full protocol 52 occurs if there is an failure in the MMI Phase 1 Flush phase 68, 72 and a Phase 2 operation 76 occurs according to the Full protocol if there is a failure in the MMI Phase 2 operation 74, 78.

Thus, it can be seen that the Full protocol 52 is resorted to when a failure occurs along the flow of the MMI protocol 50, 54. Operating according to the MMI protocol, except under failure conditions, rather than operating at all times with the Full protocol 52, causes a significant reduction in the messages involved in processing a distributed transaction.

The phases of the Full Broadcast protocol are first set forth below, followed by phases of the MMI Protocol.

Begin Transaction—TMP-Owned (Full Broadcast Protocol)

Figure 3A:
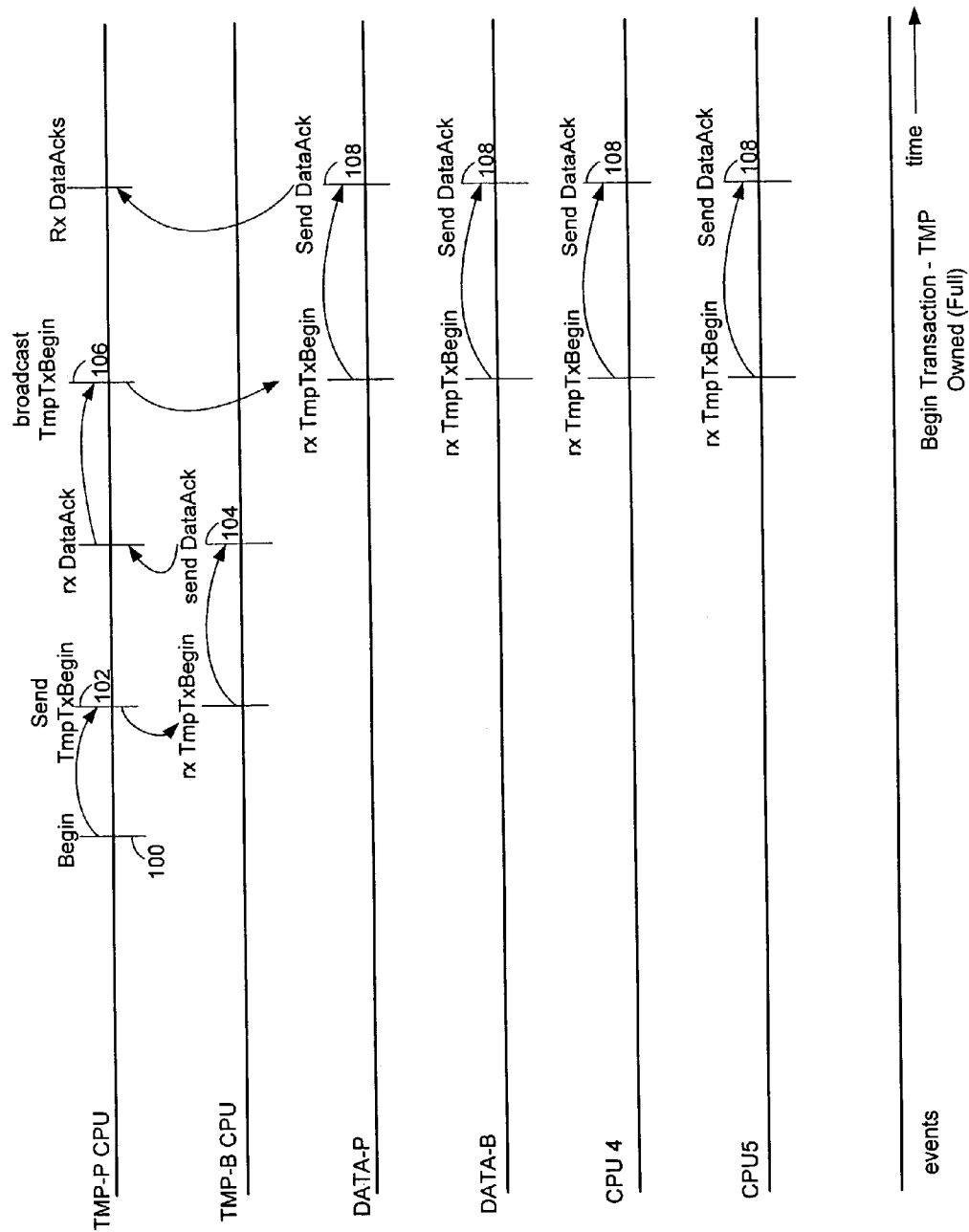
FIG. 3A sets forth a timing chart for a TMP-Owned Begin Transaction according to the Full protocol.

FIG. 3A sets for the Begin Transaction operation for a TMP-Owned Transaction in accordance with the Full Broadcast Protocol. Shown in FIG. 3A are the key messages that are sent and received in the Begin Transaction operation. The TMP-Owned transaction is started by the TMP-P process in the TMP-P CPU and essentially has two sub-phases. The first phase informs a backup TMP process (TMP-B) that TMP-P is starting a transaction. The second phase informs all of the non-TMP CPUs.

In the first sub-phase, a TMP process in the primary TMP CPU (TMP-P) makes a 'Begin' call 100 to the TMF Library (TmfLib) on the TMP-P CPU. The TmfLib is a part of a system library, in each CPU, that provides TMF (Transaction Monitor Facility) functions to applications, disk (resource manager) processes and TMF-related processes. In response to the call, the TmfLib creates a new Library Transaction Control Block (LibTcb) and searches for an empty entry in the Slot table (SlotTable). A LibTcb is a transaction control block, residing in the CPU global memory, that is managed by the TMF Library facility. A separate SlotTable reflecting each CPU resides in each CPU of a cluster. For example, if there are 16 CPUs there are 16 slot tables in each CPU. Each slot table has a slot for every LibTcb created by an originating CPU, which controls that slot entry in all of the SlotTables. If an empty SlotTable entry is found, the entry is updated with the LibTcb's address, a sequence number for the transaction (from the SlotTable entry number) and an Epoch number of 0. An Epoch number is a sequence number of a flush operation, since flushes can occur multiple times per transaction. The TmfLib next sends a 'TmpTxBegin' message 102 to the backup TMP process on the backup TMP CPU (TMP-B).

When the 'TmpTxBegin' message is received by the TMP-B process on the backup TMP CPU, a LibTcb is created for the transaction in the copy of the TMP-P CPU's SlotTable that resides on the TMP-B CPU. Then TMP-B process on the TMP-B CPU then returns a 'DataAck' message 104 to the TMP-P process on the TMP-P CPU.

Returning the 'DataAck' message causes the TMP-P process to now inform the other non-TMP CPUs of the transaction, thus beginning the second sub-phase of the 'Begin' operation.

In this second sub-phase, the TmfLib of the TMP-P process broadcasts, via its PIO transport facility, a 'TmpTx-Begin' message 106 to all of the non-TMP CPUs. The PIO transport facility is a packet I/O facility by which packets can be sent to a single CPU or broadcast to multiple CPUs. When this message is received by each of the non-TMP CPUs, each CPU creates a LibTcb for the transaction in a copy of the TMP-P CPUs SlotTable residing therewith. A 'DataAck' message 108 is returned by each non-TMP CPU to the TMP-P process, which triggers a procedure in the TmfLib of the BOwn CPU (the TMP-P CPU, in this case) to update the BOwn CPU's LibTcb state fields and starts the BOwn CPU's state machine for the transaction. The TmfLib in the TMP-P CPU then queues a 'NetTxBegin GetWork' for the TMP-P process in the TMP-P CPU confirming that the transaction's initialization is complete.

In summary, these two sub-phases inform the all of the running CPUs of the transaction. Each running CPU returns an acknowledgment that it has been so informed.

Resource Manager (DP2) Check In Trans (Full Broadcast Protocol)

This phase is an instance of a resource manager, such as a disk process, becoming associated with a transaction, by checking in with the Transaction Monitor Facility (TMF) and entering the transaction into the TmfLibrary. Both the primary resource manager process (DATA-P) and its backup process (DATA-B) must be associated with the transaction.

Figure 3B:
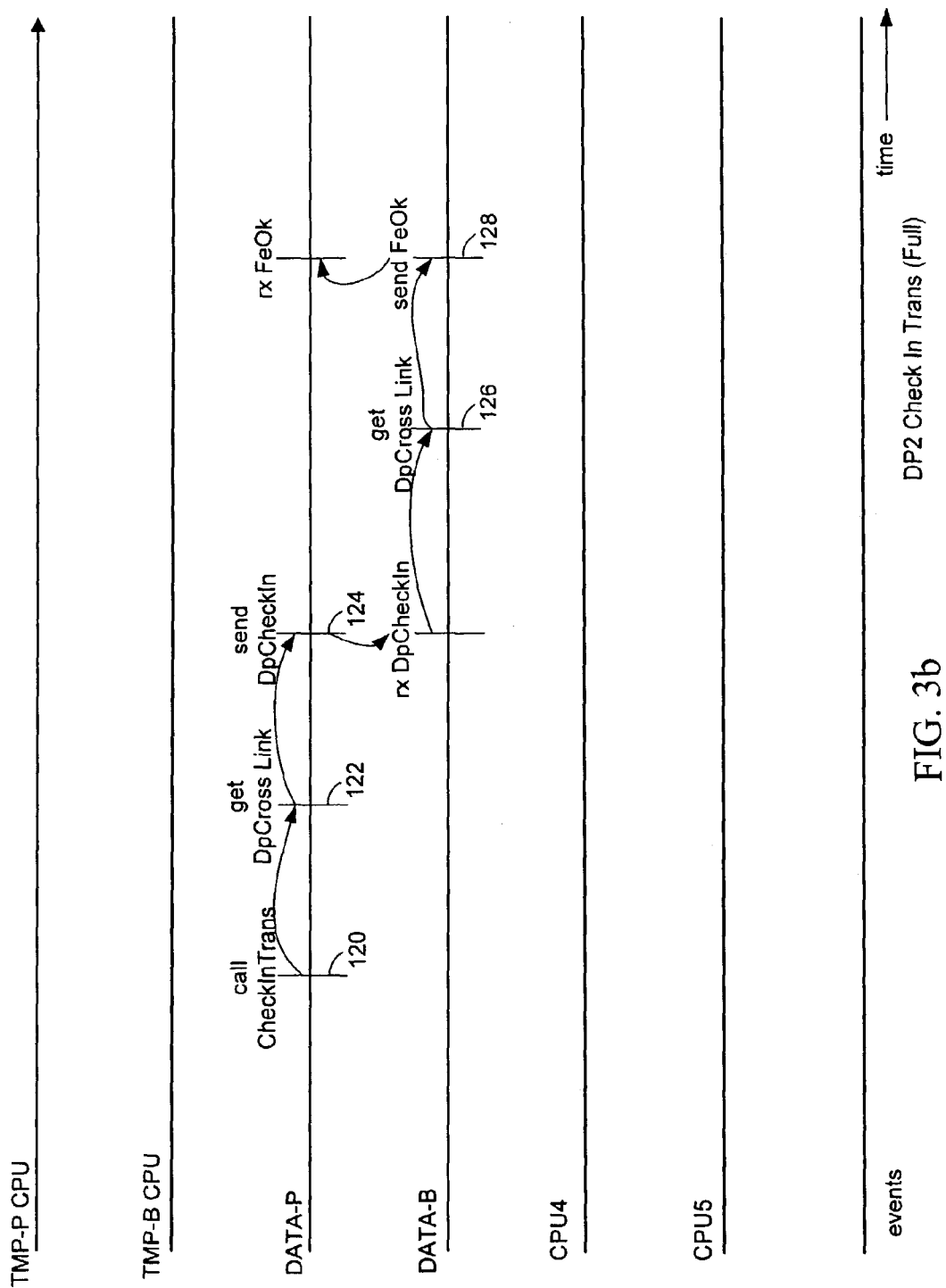
FIG. 3B sets forth a timing chart for a DP2 Check-In operation according to the Full Protocol.

Referring to FIG. 3B, after a transaction has been started by the TMP-P CPU, if a DP2 data volume must work as a resource on behalf of the transaction, the primary DP2 process must check in with the TMF for every DP2 request message with a new transactional operation (READUP-DATE, WRITEREAD, etc.). In the Full Broadcast Protocol, checking in on a transaction consists of entering that transaction into the Tmf Library, which is appropriately called TmfLib.

The first event in the resource manager Check In process, according to the Full Broadcast Protocol, is then a call to the TmfLib on the primary DP2 CPU (the primary resource manager CPU) with a 'CheckInTrans' request 120 that includes the transaction's TcbRef and epoch number. The TcbRef number is a transaction ID, which is only valid for one cluster's usage, the cluster being the cluster at which the transaction was issued, and is only valid until a TMF crash.

The TmfLib in the primary DP2 CPU checks to see if the TcbRef has an entry in the BOwn CPU's SlotTable in the primary DP2 CPU. If there is no entry, the TmfLib creates a new LibTcb in the SlotTable, if the TcbRef's sequence number and epoch number are valid. An error response is returned to the primary DP2 process, if a LibTcb does not exist and a new one cannot be created.

Next, a DpCross Link is found or created for the primary DP2 in step 122. A DpCrossLink is an association between a particular transaction and a particular data volume process pair. An error response is returned to the primary DP2 process if a DPCross link cannot be created or the epoch in the DPCross link differs from the epoch number for the transaction. Epoch numbers can differ if there has been a flush (due to a transaction abort) prior to the step of finding or creating the DpCross link.

The TmfLib in the primary DP2 CPU then sends a 'DpCheckIn' message 124 to the backup DP2 CPU, which responds by creating a LibTcb for the transaction and a DPCross link for the backup DP2 CPU, in step 126. The Backup DP2 CPU then sends an 'FeOk' message 128 response back to the primary DP2 process on the primary DP2 CPU. An 'FeOk' message is a message indicating that the prior request was successful.

Thus, in this phase, only those resource managers (e.g., data volume CPUs) that are performing work on behalf of the transaction check in with TMF.

Phase 1 Flush (Full Broadcast Protocol)

Figure 3C:
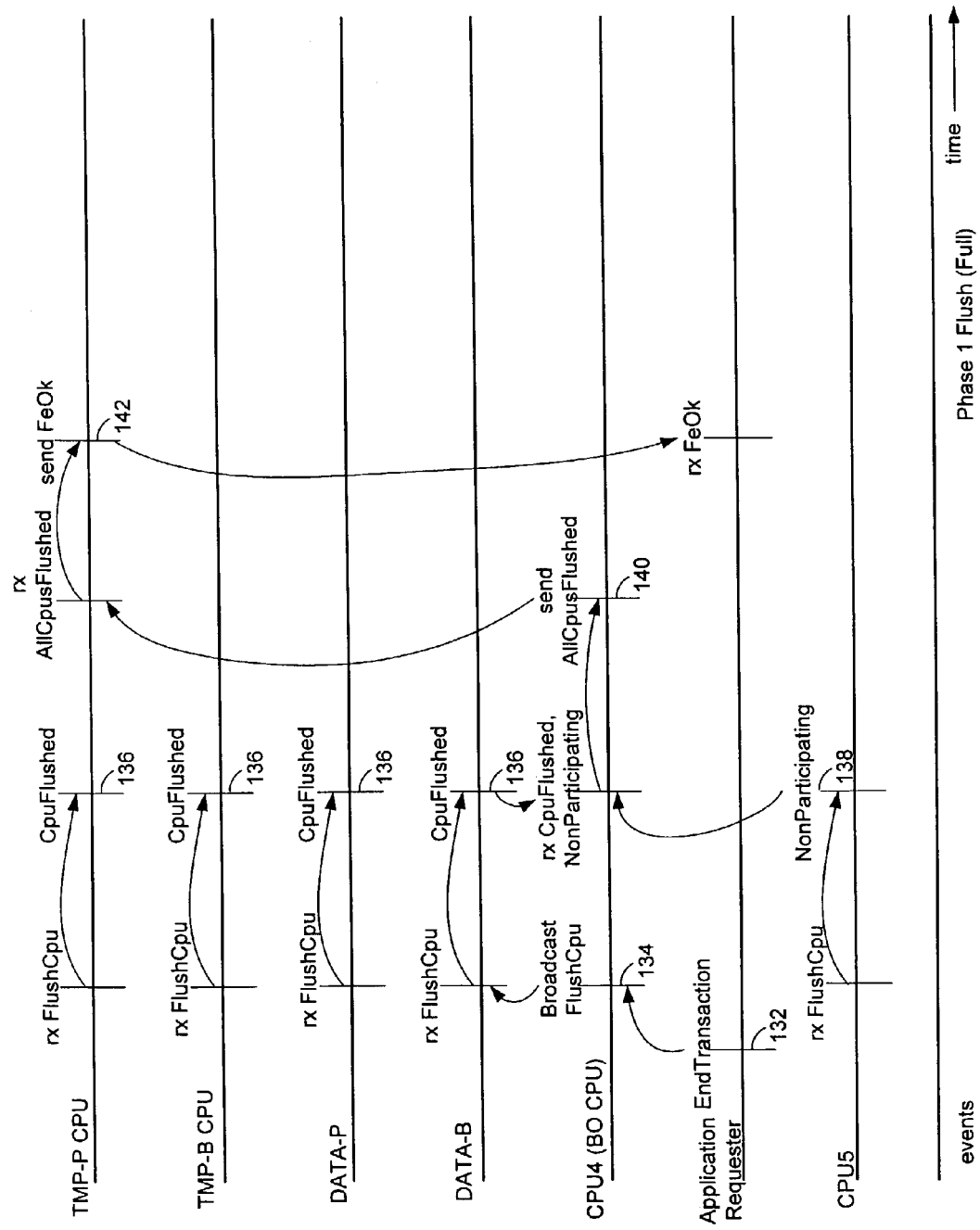
FIG. 3C sets forth a timing chart for a Phase 1 Flush operation according to the Full Protocol.

This part of the protocol, shown in FIG. 3C, is complex because the BOwn CPU does not know which resource managers participated in the transaction. All of the CPUs in the system must be sent a request to end the transaction to find out which resource managers actually participated.

First, the Application requester (the transaction beginner) process calls 'EndTransaction' 132. The BOwn CPU (in this case, the CPU on which the Application Requester resides) then broadcasts a 'FlushCpu' message 134 for epoch 0 to all running CPUs, including itself for the transaction in question.

Each CPU having a resource manager that participated in the transaction instructs its participating primary resource manager CPUs, in response to the 'FlushCpu message,' to flush its audit buffers to the audit log disk process input buffer, if the audit buffer is not already flushed for the transaction. If the audit is already flushed or when the flush is completed, each participating CPU updates its LibTcb, DpCross links and SlotTable epoch number and sends a 'CpuFlushed' message 136 to the BOwn CPU. The BOwn CPU maintains a bit mask for the participating CPUs (i.e., CPUs having participating resource managers) and a bit is set in that mask for each CPU that responds with a 'Cpu-Flushed' message.

CPUs without a LibTcb for the transaction (because they were never checked in by any participating resource manager) send a 'NonParticipating' message 138 to the BOwn CPU. These CPUs do not have their bit set in the bit mask.

After all of the CPUs have responded to the 'FlushCpu' message, the BOwn CPU sends an 'AllCpusFlushed' message 140 to the primary TMP (TMP-P) process. The TMP-P process controls the transaction from this point forward. An 'FeOk' response 142 is returned by the TMP-P process to the Application Requester.

Thus, a Phase 1 Flush, according to the Full Broadcast protocol, involves each CPU receiving a 'FlushCpu' message and each CPU responding either that it did or did not participate. The result is that a large number of messages are transferred over the cluster interconnect during this operation. As the number of CPUs interconnected in a cluster increases, the number of messages also increases for each transaction, indicating that the Full Broadcast Protocol does not scale well with the addition of CPUs.

Phase 2 (Full Broadcast Protocol)

Figure 3D:
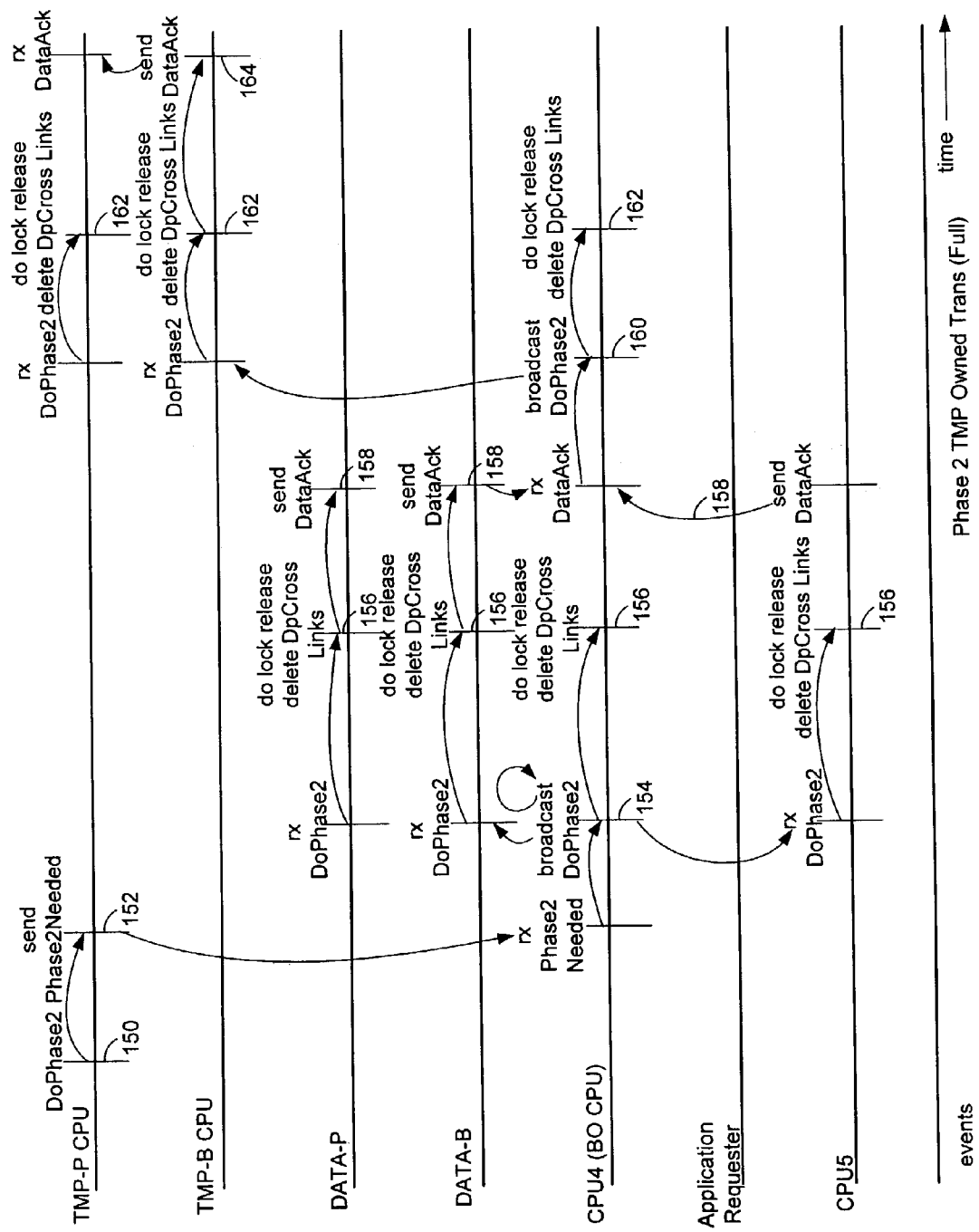
FIG. 3D sets forth a timing chart for a TMP-Owned Phase 2 operation according to the Full Protocol.

The final phase of the Full protocol is shown in FIG. 3D and also involves all of the CPUs. There are two subphases. The first subphase involves sending a broadcast to all of the CPUs except for the TMP CPUs. The second subphase involves sending a broadcast to the TMP CPUs.

To start the Phase 2 (lock release) operation for a transaction, the primary TMP process calls its TmfLib with a 'DoPhase2' request 150. The TmfLib in the primary TMP CPU sends a 'Phase 2 Needed' message 152 to the BOwn CPU, which in this case is the same CPU.

The BOwn CPU broadcasts a 'DoPhase' message to all CPUs except the TMP CPUs. Each CPU receiving the 'DoPhase' message 154, then tells its involved resource managers (e.g., DP2 CPUs) to perform a Phase 2 operation 156, and then deletes the DpCross links and LibTcb from the involved resource managers.

A 'DataAck' message 158 is returned to the BOwn CPU by each CPU that received the 'DoPhase' message.

Next, the BOwn CPU broadcasts a 'DoPhase' message 160 to the TMP CPUs. Each TMP CPU then tells its involved resource managers (e.g., DP2 CPUs) to each perform a Phase 2 operation 162 and then delete its DpCross links. The backup TMP CPU deletes its own LibTcb entry and a 'DataAck' message 164 is returned by the backup TMP CPU, which triggers a procedure that deletes the LibTcb in the primary TMP CPU. Finally, the TmfLib in the primary TMP CPU queues a 'TxPhase2 GetWork' for the TMP process, thereby informing the process that the transaction is terminated in the TMF Library.

In summary, the Full Broadcast protocol involves a begin message to the TMP-B CPU, a begin transaction broadcast to all non-TMP CPUs, a flush broadcast to all CPUs to end the transaction, a broadcast to the non-TMP CPUs, and then a broadcast to the TMP CPUs to release locks.

The Registration (MMI) Protocol—TMP-Owned

Figure 4A:
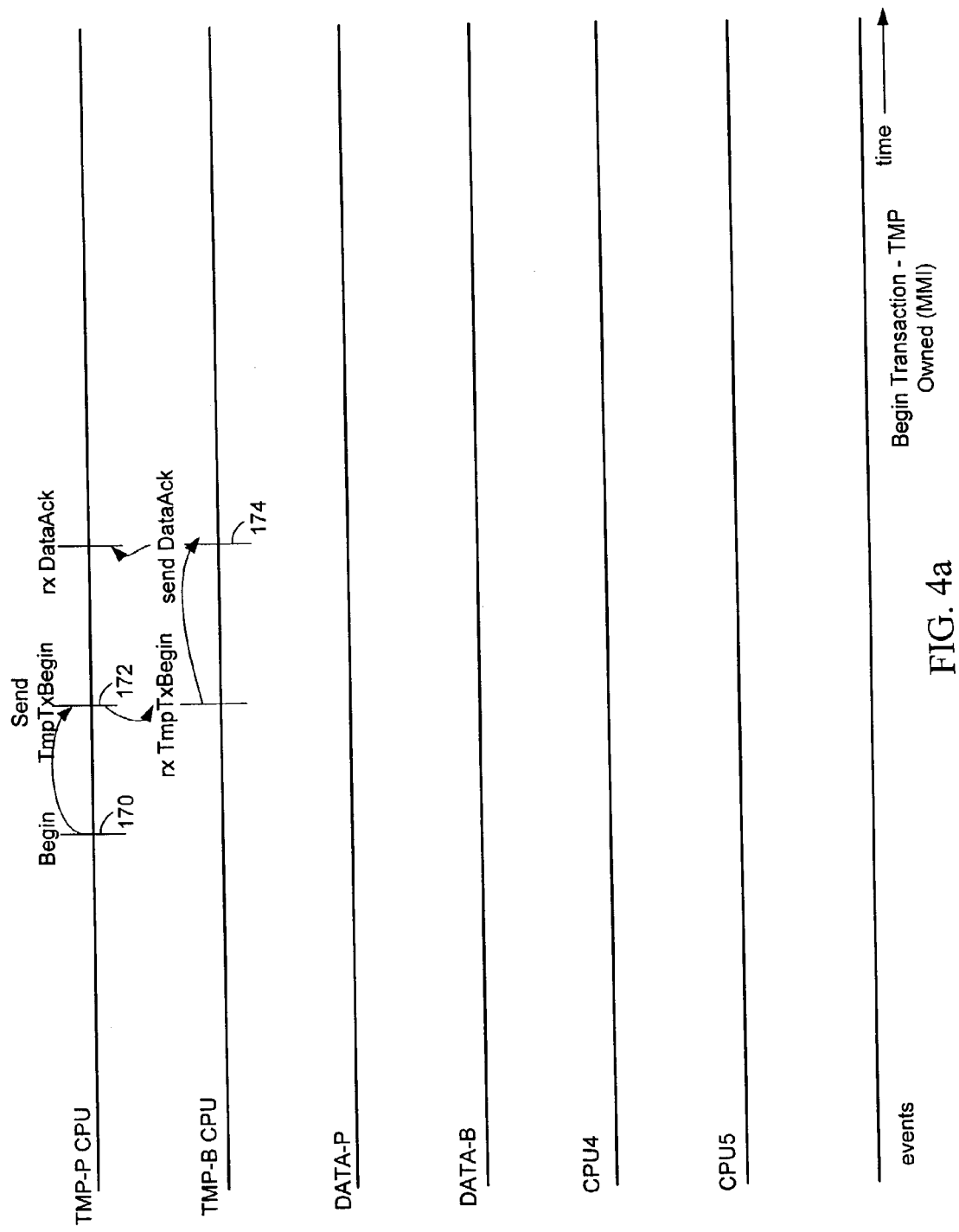
FIG. 4A sets forth a timing chart for a TMP-Owned Begin Transaction according to a MMI protocol.

FIG. 4A illustrates the registration protocol for a TMP-Owned transaction. The protocol starts with the primary TMP Process calling its TmfLib with a 'Begin' request 170. The TmfLib creates a new LibTcb and searches for an empty SlotTable entry, as described above. If an empty SlotTable entry is found, the SlotTable is updated with the LibTcb's address, the transaction's sequence number (from the SlotTable entry number) and an epoch number of 0.

The TmfLib of the primary TMP CPU (TMP-P) sends a 'TmpTxBegin' message 172 to the backup TMP CPU (TMP-B) which creates, in response, a LibTcb for the transaction in the copy of the primary TMP CPU's SlotTable that resides in the backup TMP CPU.

A 'DataAck' message 174 is returned by the backup TMP CPU to the primary TMP CPU, triggering a procedure in the TmfLib of the primary TMP CPU that updates the BOwn CPU's (in this case the primary TMP CPU) LibTcb state fields and initiates a state machine in the BOwn CPU for the transaction.

The TmfLib in the primary TMP CPU queues a 'NetTxBegin GetWork' command for the primary TMP process informing the process that the transaction's initialization is complete.

In summary, only the TMP CPUs are involved in starting a transaction.

Resource Manager Check in Phase (i.e., DP CheckIn) Phase (Registration Protocol)

Figure 4B:
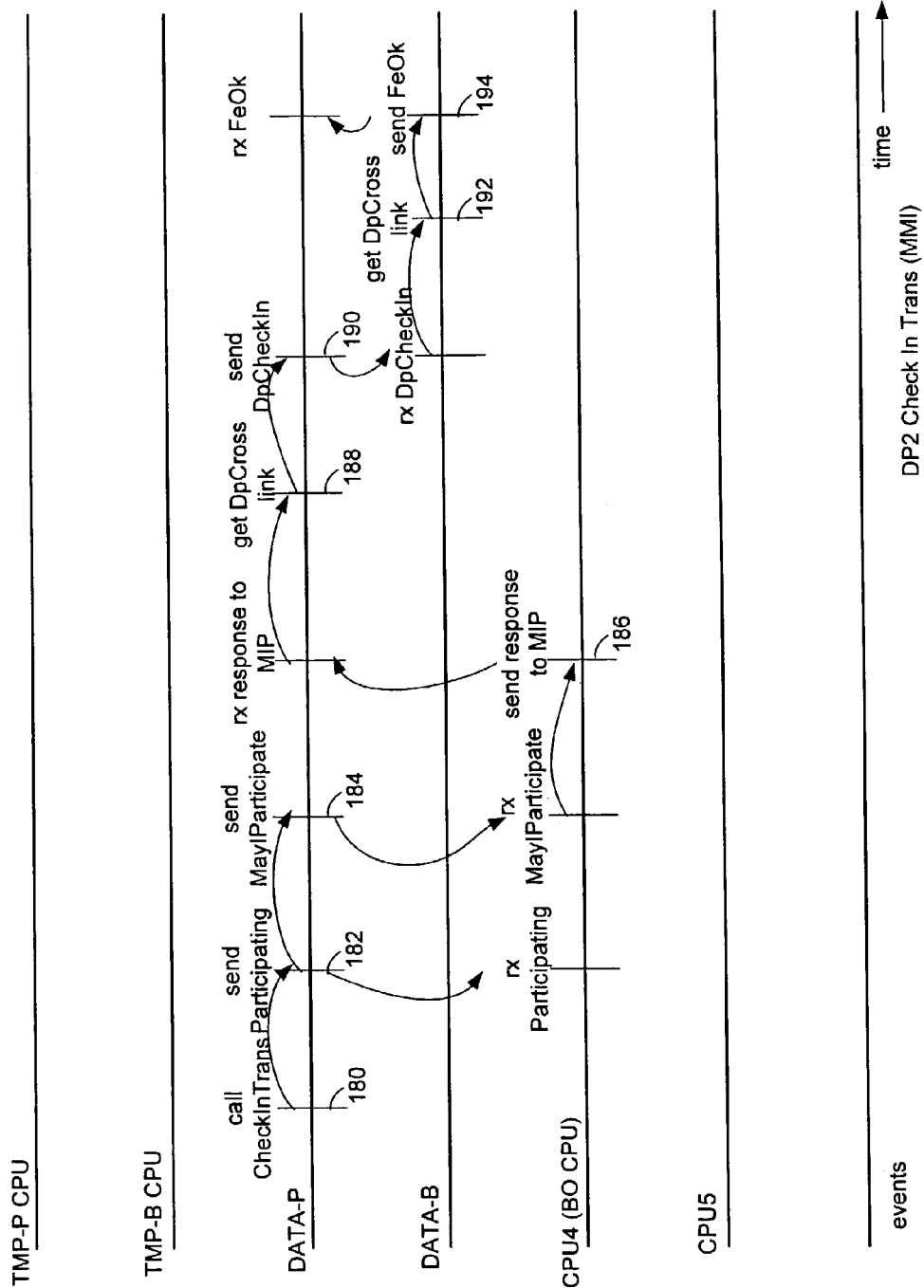
FIG. 4B sets forth a timing chart for a DP2 Check-In operation according to the MMI protocol.

The registration protocol is more complex than the Full Broadcast Protocol in the resource manager check In phase, shown in FIG. 4B, but only the DP2 CPUs are involved.

The primary resource manager (primary DP2) process calls requests a 'DpCheckInTrans' 180 in its TmfLib with the transaction's TcbRef and epoch number. The TmfLib in the primary DP2 CPU checks to see if the TcbRef has an entry in the SlotTable and, if not, creates a new LibTcb, if the TcbRef's sequence number and epoch number are valid. If a LibTcb does not exist and a new one cannot be created, an error response is returned to the primary DP2 process.

Next, the TmfLib in the primary DP2 CPU sends a 'Participating' message 182 to the BOwn CPU for any brother CPUs which are not already registered. The TmfLib in the primary DP2 CPU then sends a 'May-I-Participate' message 184 to the BOwn CPU. One thread of the primary DP2 process is held in a wait loop waiting for a response to the message and queuing requests.

A 'May-I-Participate' response message 186 is next sent by the BOwn CPU back to the waiting primary DP2 process. The primary DP2 process is awakened by a special wakeup, LTmf, and a DPCross link is found or created for the primary DP2 process. If the primary DP2 process does not accept the special wakeup, LTmf, message, the transaction's LibTcb is deleted from the BOwn CPU's SlotTable in the primary DP2 CPU, and an error response is returned to the primary DP2 process.

The DpCross link is found or created for the primary DP2 CPU in step 188 or an error response is returned to the primary DP2 process if one cannot be created or the cross link epoch number and the slot epoch number disagree.

The TmfLib in the primary DP2 CPU next sends 'DpCheckIn' message 190 to the backup DP2 process. When the 'DpCheckIn' message is received, a LibTcb is created for the transaction in the BOwn CPU's SlotTable in the backup DP2 CPU and a DpCross link is created for the backup DP2 process.

An 'FeOk' response 194 is returned by the backup DP2 process to the primary DP2 process. If the TmfLib in the backup DP2 CPU was late, the TmfLib in the backup CPU sends a CheckInResult message to the primary CPU informing it of the CheckIn.

In summary, in the registration protocol only the participating resource managers register to participate in a transaction.

Phase 1 Flush (Registration Protocol)

In the Registration Protocol, when the time comes to flush the changes made by a transaction, the list of CPUs that participated is completely known (except during the processing of failures, in which case the system reverts to the Full Broadcast protocol). This permits a more simplified protocol near the end of a transaction, which is the time critical portion of the protocol.

Figure 4C:
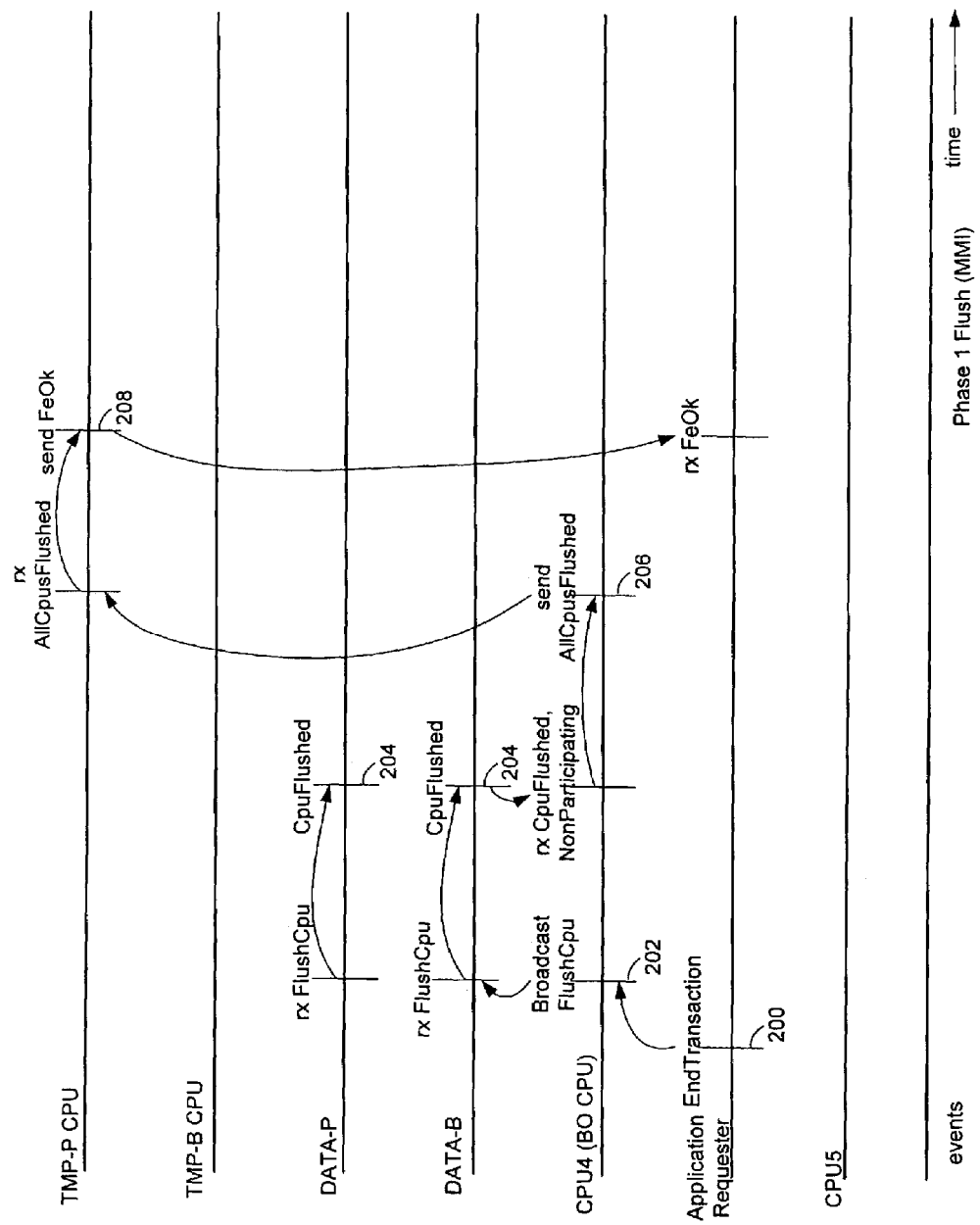
FIG. 4C sets forth a timing chart for a Phase 1 Flush operation according to the MMI protocol.

In the FIG. 4C, the Application requester (the transaction beginner) process makes an 'EndTransaction' call 200. The BOwn CPU receives the call and broadcasts a 'FlushCpu' message 202 for epoch 0, only to the CPUs that have registered as participating in the transaction including the BOwn CPU.

The participating CPUs instruct their primary resource managers (i.e., DP2 processes) to flush their audit buffers to the audit-log, disk-process input buffer, if the audit buffer is not already flushed for the transaction being completed. If the audit buffer is already flushed or when the flush is completed, each CPU updates its LibTcB, DpCross links, and SlotTable EpochNum, and sends 'CpuFlushed' message 204 to the BOwn CPU.

After each participating CPU has responded to the transaction flush, the BOwn CPU sends an 'AllCpusFlushed' 206 message to the primary TMP CPU.

When the 'AllCpusFlushed' message 206 is received by the primary TMP CPU, the TmfLib queues a 'Phase 1 Flush GetWork' for the primary TMP Process. The primary TMP is now informed of the transaction and returns an 'FeOk' response message 208 to the Application Requester process.

Thus, the message traffic is substantially reduced in this phase compared to the Phase 1 Flush phase in the Full Broadcast protocol. Message traffic is confined to the registered and participating CPUs, the Broadcast Owner and the primary TMP CPU.

Phase 2 (Lock Release) Operation (Registration Protocol)

Figure 4D:
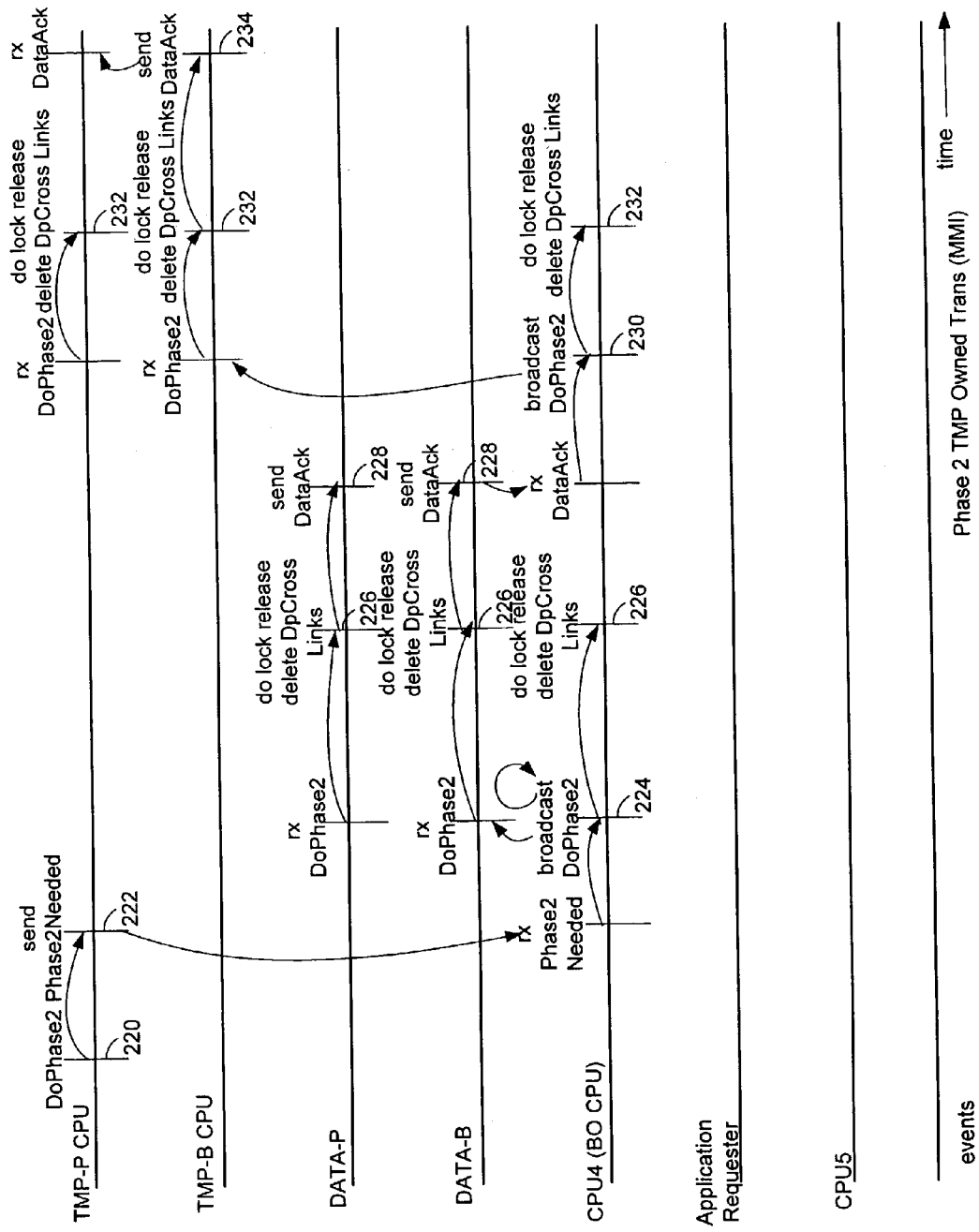
FIG. 4D sets forth a timing chart for a TMP-Owned Phase 2 operation according to the MMI protocol.

The Phase 2 operation, shown in FIG. 4D, starts with the primary TMP process making a 'DoPhase2 ' call 220 to its TmfLib. The TmfLib in the primary TMP CPU sends a 'Phase2Needed' message 222 to the BOwn CPU, which is the same CPU. The BOwn CPU next broadcasts a 'DoPhase2 ' message 224 to all registered and participating CPUs, except the TMP CPUs. When received, each CPU requests that its involved resource managers (DP2 s) perform a Phase2 (lock release) 226, and then delete its DpCross links and the LibTcb in the resource manager CPU (i.e., DP2 CPU).

A 'DataAck' message 228 is returned to the BOwn CPU by each recipient CPU of a 'DoPhase2 ' message, which causes the BOwn CPU to broadcast a message 'DoPhase2 ' message 230 to the TMP CPUs. When received, each TMP CPU tells its involved resource managers (DP2 CPUs) to do a Phase2 (lock release) 232 and then deletes its DPCross links. The backup TMP CPU also deletes its LibTcb. A 'DataAck' message 234 is returned by the backup TMP CPU which causes the primary TMP CPU to delete its LibTcb. The TmfLib in the primary TMP CPU then queues a 'TxPhase2 GetWork' message for the TMP informing the primary TMP CPU that the transaction is completed in the TMF Library.

Thus, the Phase2 operation, according to the registration protocol, is performed in two sub-phases. In the first sub-phase, the registered and participating resource managers perform a lock release and in the second phase, the primary and backup TMP CPUs perform a lock release.

Application-Initiated Begin Transaction

Figure 5A:
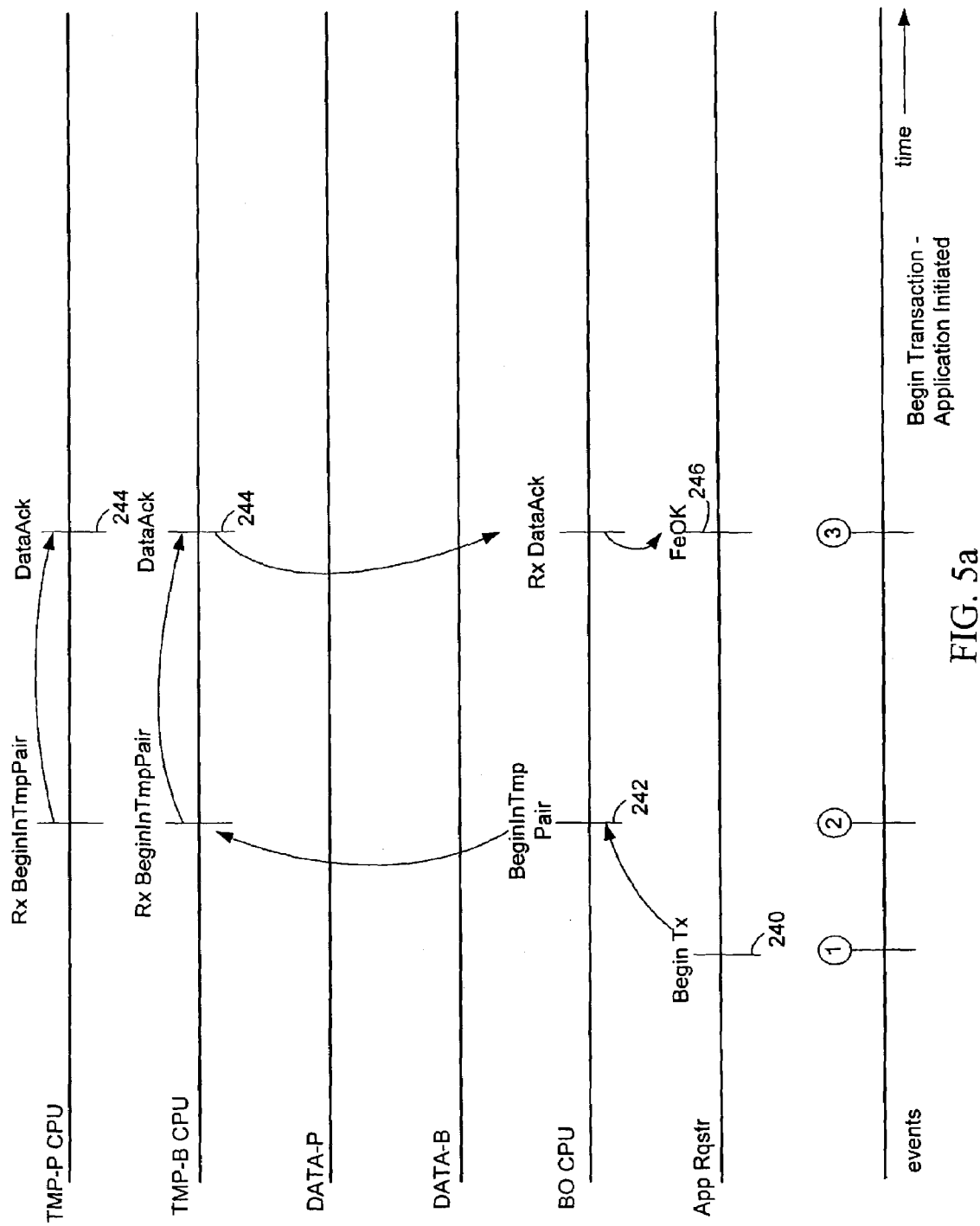
FIG. 5A sets forth a timing chart for a Application-Initiated Begin Transaction operation.

FIG. 5A sets forth a timing chart for a Application-Initiated Begin Transaction operation. As described above, an Application process on a CPU in the cluster can start a transaction. If the Application process exports a transaction to another node, then the primary TMP (TMP-P) process will initiate the TMP-owned transaction on that node.

The process of beginning a transaction, for a Transaction Monitor Facility (TMF) Application, involves reliably establishing a transaction in the cluster. Each cluster that is involved in the transaction has a TMF Library and a PIO transport facility. The CPU that sends a packet sent by its PIO transport facility receives a 'DataAck' when the CPU or CPUs to which the packet was sent has guaranteed to respond to the contents of the message or if the CPU is down.

The first event in the operation is the Application making a 'BeginTransaction' call 240 to the TmfLib on the CPU of the Application requester. The TmfLib responds to the call by creating a new LibTcb and searching for an empty slot in the SlotTable. If an empty entry is found, the SlotTable entry is updated with the LibTcb's address, the transaction's sequence number (from the SlotTable entry number) and an Epoch Number of 0.

The BOwn CPU (the CPU on which the Application process is running) then broadcasts, via its PIO facility, a 'BeginTmpPair' message 242 to the TMP CPUs. When received, each TMP CPU creates a LibTcb for the transaction in the copy of the BOwn CPU's SlotTable that exists in the TMP CPUs. A 'DataAck' message 244 (again via the PIO facility) is returned by the TMP CPUs causing the TmfLib to update the BOwn CPUs LibTcb state fields and the BOwn CPU's state machine to being for the transaction. An 'FeOK' response message 246 is returned to the Application requester process, indicating a successful completion of the Begin transaction request.

Application-Initiated Transaction—Phase 2

Figure 5B:
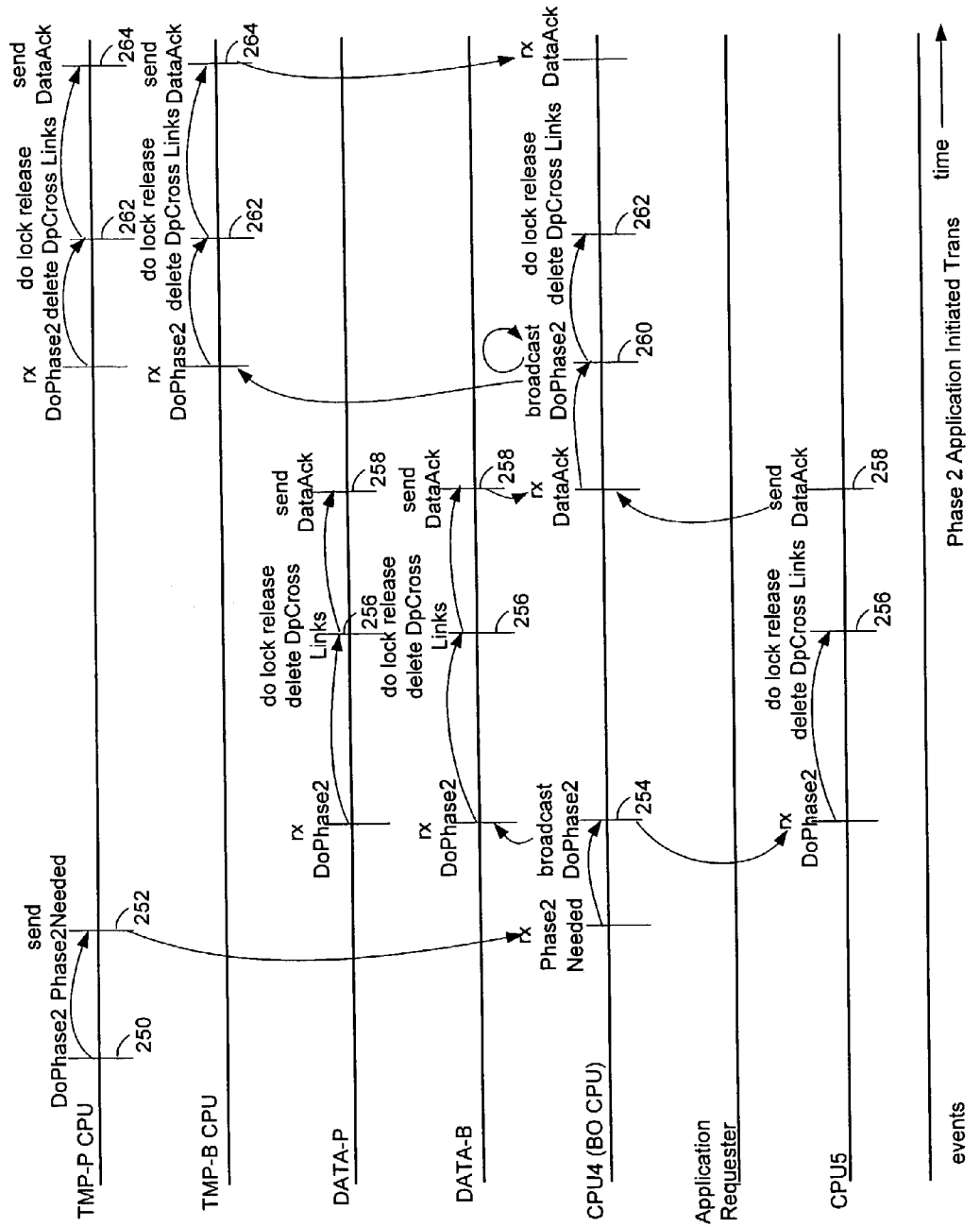
FIG. 5B sets forth a timing chart for an Application-Initiated Transaction Phase 2 operation.

As shown in FIG. 5B, to perform a Phase 2 operation, the primary TMP process makes a 'DoPhase2 ' call 250 into its TmfLib, which sends a 'Phase2 Needed' message 252 to the BOwn CPU.

The BOwn CPU then broadcasts a 'DoPhase2 ' message 254 to all registered and participating CPUs, except both of the TMP CPUs and the BOwn CPU. When this message is received, each CPU requests that its involved resource manager processes perform a Phase2 (lock release) operation 256 and delete its DpCross links and the LibTcb in the resource manager CPUs.

Each CPU receiving the 'DoPhase2 ' message returns a 'DataAck' message 258 to the BOwn CPU, which causes BOwn CPU to broadcast a 'DoPhase2 ' message 260 to the TMP CPUs and itself. When received, each TMP CPU requests that its involved resource managers (DP2 s) perform a Phase2 (lock release) 262, and the involved resource manager (DP2 ) CPUs then delete their DPCross links. Each TMP CPU deletes its LibTcb for the transaction being completed and returns a 'DataAck' message 264 to the BOwn CPU. This causes the BOwn CPU to delete the LibTcb in the BOwn CPU for the transaction.

The TmfLib in the primary TMP CPU then informs the TMP process that the transaction is completed in the TMF Library by queuing a 'TxPhase2 GetWork' request for the TMP process.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of performing a transaction in a processing cluster having a plurality of processing units, one of the processing units hosting a transaction monitor, at least one processing unit hosting a resource manager, each of the processing units including a CPU and volatile storage and having access to stable storage, the method comprising:

beginning a transaction by the transaction monitor, and performing the following steps if no processing unit failure occurs:

registering one or more resource managers to participate in the transaction, the processing units hosting the participating resource managers being participating processing units;

performing work required by the transaction by the one or more participating resource managers, including obtaining any locks needed by the transaction;

upon completion of the transaction work by the participating resource managers, performing a phase 1 operation in which a flush request is broadcast to each participating processing unit, the flush request instructing each participating processing unit to send a response indicating that information in volatile storage is flushed to stable storage;

upon completion of the phase 1 operation, requesting a phase 2 operation by broadcasting a lock-release request to each participating processing unit, except the processing unit hosting the transaction monitor;

releasing any locks acquired for the transaction while performing work required by the transaction in response to the phase 2 request; and after releasing all locks acquired for the transaction, informing the transaction monitor that phase 2 is completed; and wherein if a failure occurs during a phase 2 operation, requesting a phase 2 operation in which a release-lock request is broadcast to each processing unit, except the processing unit hosting the transaction monitor;

releasing any locks acquired for the transaction while performing work required by the transaction; and after releasing all locks acquired for the transaction, informing the transaction monitor that the transaction is completed.

2. A method of performing a transaction as recited in claim 1, wherein the transaction monitor is implemented as a process pair that includes a primary and backup transaction monitor; and further comprising the step of informing the backup transaction monitor of the beginning 30 of the transaction prior to performing the registering step.

3. A method of performing a transaction as recited in claim 1, wherein the transaction monitor is implemented as a process pair that includes a primary and backup transaction monitor; and wherein the primary transaction monitor receives a response that all processing units are flushed prior to the completion of the phase 1 operation.

4. A method of performing a transaction as recited in claim 1, wherein the transaction monitor is implemented as a process pair that includes a primary and backup transaction monitor;

wherein the primary transaction monitor receives a message requesting the transaction monitor process pair to release locks, after all participating processing units, except the processing units hosting the transaction monitor process pair, have completed a phase 2 lock release operation; and further comprising the step of performing, in response to the message, a phase 2 lock release operation by the transaction monitor process pair.

5. A method of performing a transaction as recited in claim 1, wherein the resource manager is implemented as a process pair that includes a primary and backup resource manager; and wherein the step of registering one or more resource managers to participate in the transaction includes registering the primary and backup resource manager.

6. A method of performing a transaction as recited in claim 1, wherein the resource manager is implemented as a process pair that includes a primary and backup resource manager; and wherein the step of performing a phase 1 flush operation includes performing a phase 1 flush operation by each of the primary and backup resource managers.

7. A method of performing a transaction as recited in claim 1, wherein the resource manager is implemented as a process pair that includes a primary and backup resource manager; and wherein the step of releasing any locks includes releasing, by each of the primary and backup resource managers, any locks acquired by the primary and backup resource managers.

8. A method of performing a transaction as recited in claim 1, the method further comprising:

if a failure occurs during a phase 1 operation, performing a phase 1 operation in which a flush request is broadcast to each processing unit, the flush request instructing each processing unit working behalf of the transaction to send a response indicating that information in volatile storage is flushed to stable storage and instructing processing units not working on behalf of the transaction to so indicate; and upon completion of the phase 1 operation, performing the procedure consequent to failure during a phase 2 operation.

9. A method of performing a transaction as recited in claim 8, the method further comprising:

if a failure occurs during registering, broadcasting a begin transaction message to all processing units, accept the unit hosting the transaction monitor; and upon completion of said registering, performing the procedure consequent to failure during a phase 1 operation.

10. A method of performing a transaction in a processing cluster having a plurality of processing units, one of the processing units hosting a transaction monitor, at least one processing unit hosting a resource manager, each of the processing units inducing a CPU and volatile storage and having access to stable storage, the method comprising:

beginning a transaction by the transaction monitor, broadcasting a begin transaction message to all processing units, except the unit hosting the transaction monitor;

performing work required by the transaction by the one or more resource managers working on behalf of the transaction, including obtaining any locks needed by the transaction;

upon completion of the transaction work by the resource managers working on behalf of the transaction, during a phase 1 operation in which a flush request as broadcast to each processing unit, the flush request instructing each processing unit working behalf of the transaction to send a response indicating that information in volatile storage is flushed to stable storage and instructing processing units not working on behalf of the transaction to so indicate;

upon completion of the phase 1 operation, requesting a phase 2 operation in which a release-lock request is broadcast to each processing unit, except the processing unit hosting the transaction monitor;

releasing any locks acquired for the transaction while performing work required by the transaction; and after releasing all locks acquired for the transaction, informing the transaction monitor that phase 2 is completed.

11. A method of performing a transaction in a processing duster having a plurality of processing units, one of the processing units hosting a transaction monitor, at least one processing unit hosting an application program and a resource manager, each of the processing units including a CPU and volatile storage and having access to stable storage, the method comprising:
- beginning a transaction by the application program;
- informing the transaction monitor that a transaction is begun; and
  - performing the following steps if no processing unit failure occurs;
  - registering one or more resource managers to participate in the transaction, the processing units hosting the participating resource managers being participating processing units;
  - performing work required by the transaction by the one or more participating resource managers, inducting obtaining any locks needed by the transaction;
  - upon completion of the transaction work by the participating resource managers, performing a phase 1 operation in which a flush request is broadcast to each participating processing unit, the flush request instructing each participating processing unit to send a response indicating that information in volatile storage is flushed to stable storage;
  - upon completion of the phase 1 operation, requesting a phase 2 operation by broadcasting a lock-release request to each participating processing unit, except the processing unit hosting the transaction monitor;
  - releasing any locks acquired for the transaction while performing work required by the transaction in response to the phase 2 request; and
  - after releasing all locks acquired for the transaction, informing the transaction 30 monitor that phase 2 is completed; and
  - if a failure occurs during a phase 2 operation,
  - requesting a modified phase 2 operation in which a release-lock request is broadcast to each processing unit, except the processing unit hosting the transaction monitor;
  - releasing any locks acquired for the transaction while performing work required by the transaction; and
  - after releasing all locks acquired for the transaction, informing the transaction monitor that phase 2 is completed.

12. A method of performing a transaction as recited in claim 11,
- wherein the transaction monitor is implemented as a process pair that includes a primary and backup transaction monitor; and
- further comprising the step of informing the backup transaction monitor of the beginning of the transaction prior to performing the registering step.

13. A method of performing a transaction as recited in claim 11,
- wherein the transaction monitor is implemented as a process pair that includes a primary and backup transaction monitor; and
- wherein the primary transaction monitor receives a response that all processing units are flushed prior to the completion of the phase 1 operation.

14. A method of performing a transaction as recited in claim 11, wherein the transaction monitor is implemented as a process pair that includes a primary and backup transaction monitor,
- wherein the primary transaction monitor receives a message requesting the transaction monitor process pair to release locks, after all participating processing units, except the processing units hosting the transaction monitor process pair, have completed a phase 2 lock release operation; and
- further comprising the step of performing, in response to the message, a phase 2 lock release operation by the transaction monitor process pair.

15. A method of performing a transaction as recited in claim 11,
- wherein the resource manager is implemented as a process pair that includes a primary and backup resource manager; and
- wherein the step of registering one or more resource managers to participate in the transaction includes registering the primary and backup resource manager.

16. A method of performing a transaction as recited in claim 11,
- wherein the resource manager is implemented as a process pair that includes a primary and backup resource manager, and
- wherein the step of performing a phase 1 flush operation includes performing a phase 1 flush operation by each of the primary and backup resource managers.

17. A method of performing a transaction as recited in claim 11,
- wherein the resource manager is implemented as a process pair that includes a primary and backup resource manager; and
- wherein the step of releasing any locks includes releasing, by each of the primary and backup resource managers, any locks acquired by the primary and backup resource managers.

18. A method of performing a transaction as recited in claim 11, the method further comprising:
- if a failure occurs during a phase 1 operation,
  - performing a phase 1 operation in which a flush request is broadcast to each processing unit, the flush request instructing each processing unit working behalf of the transaction to send a response indicating that information in volatile storage is flushed to stable storage and instructing processing units not working on behalf of the transaction to so indicate;
  - upon completion of the phase 1 operation, performing said modified procedure consequent to failure during a phase 1 operation.

19. A method of performing a transaction as recited in claim 18, the method further comprising:
- if a failure occurs during registering,
  - broadcasting a begin transaction message to all processing units, except the unit hosting the transaction monitor; and
  - upon completion of said registering, performing said modified procedure consequent to failure during a phase 1 operation.

20. A processing duster comprising:
- a stable storage system;
- a plurality of processing units, each processing unit including a CPU and a volatile
- memory in which data and programs reside, and configured to access the stable storage system, wherein a designated one of the processing units hosts a transaction monitor program and at least one processing unit hosts a resource manager program, wherein the transaction monitor is configured to begin a transaction, and if no processing unit failure occurs:
  register one or more resource managers to participate in the transaction, the processing units hosting the participating resource managers being participating processing units;
  cause the one or more participating resource managers to perform work required by the transaction, including obtaining any locks needed by the transaction;
  upon completion of the transaction work by the participating resource managers, cause a phase 1 operation to be performed in which a flush request is broadcast to each participating processing unit, the flush request instructing each participating processing unit to send a response to the transaction monitor indicating that information in volatile storage is flushed to stable storage;
  upon completion of the phase 1 operation, cause a phase 2 operation by broadcasting a lock-release request to each participating processing unit, except the processing unit hosting the transaction monitor, any locks acquired for the transaction while performing work required by the transaction being released in response to the phase 2 request; and receive a message indicating that phase 2 is completed; and
wherein the transaction monitor is further configured to:
if a failure occurs during a phase 2 operation,
  cause a modified phase 2 operation to be performed in which a release-lock request is broadcast to each processing unit, except the processing unit hosting the transaction monitor, any locks acquired for the transaction while performing work required by the transaction being released in response to the release-lock request; and
  receive a message that phase 2 is completed.

21. A processing cluster as recited in claim 20, wherein the transaction monitor is further configured to:
if a failure occurs during a phase 1 operation,
  cause a modified phase 1 operation to be performed in which a flush request is broadcast to each processing unit, the flush request instructing each processing unit working behalf of the transaction to send a response indicating that information in volatile storage is flushed to stable storage and instructing processing units not working on behalf of the transaction to so indicate;
  upon completion of the phase 1 operation, causing said modified phase 2 operation to be performed.

22. A processing cluster as recited in claim 21, wherein the transaction monitor is further configured to:
if a failure occurs during registering,
  broadcast a begin transaction message to all processing units, except the unit hosting the transaction monitor;
  cause the one or more resource managers to perform work required by the transaction on behalf of the transaction, including obtaining any locks needed by the transaction;
  upon completion of the transaction work by the resource managers working on behalf of the transaction, cause a said modified phase 1 operation to be performed.

* * * * *

UNITED STATES PATENT AND TRADEMARK OFFICE
CERTIFICATE OF CORRECTION

PATENT NO. : 7,028,219 B2
APPLICATION NO. : 10/302627
DATED : April 11, 2006
INVENTOR(S) : Charles Stuart Johnson et al.

It is certified that error appears in the above-identified patent and that said Letters Patent is hereby corrected as shown below:

In column 3, line 61, delete "no" and insert -- not --, therefor.

In column 7, line 18, delete "'DoPhase'" and insert -- 'DoPhase2' --, therefor.

In column 7, line 20, delete "'DoPhase'" and insert -- 'DoPhase2' --, therefor.

In column 7, line 25, delete "'DoPhase'" and insert -- 'DoPhase2' --, therefor.

In column 7, line 26, delete "'DoPhase'" and insert -- 'DoPhase2' --, therefor.

In column 10, line 50, in Claim 1, delete "processing units" and insert -- CPUs --, therefor.

In column 10, line 51, in Claim 1, delete "processing units" and insert -- CPUs --, therefor.

In column 10, line 52, in Claim 1, delete "processing unit" and insert -- CPU --, therefor.

In column 10, line 53, in Claim 1, delete "processing units" and insert -- CPUs --, therefor.

In column 10, line 53, in Claim 1, after "including" delete "a CPU and".

In column 10, line 55, in Claim 1, delete "monitor," and insert -- monitor; --, therefor.

In column 10, line 56, in Claim 1, delete "processing unit" and insert -- CPU --, therefor.

In column 10, line 59, in Claim 1, delete "processing units" and insert -- CPUs --, therefor.

In column 10, line 61, in Claim 1, delete "processing units" and insert -- CPUs --, therefor.

UNITED STATES PATENT AND TRADEMARK OFFICE
CERTIFICATE OF CORRECTION

| | | |
|---|---|---|
| PATENT NO. | : 7,028,219 B2 | |
| APPLICATION NO. | : 10/302627 | |
| DATED | : April 11, 2006 | |
| INVENTOR(S) | : Charles Stuart Johnson et al. | |

It is certified that error appears in the above-identified patent and that said Letters Patent is hereby corrected as shown below:

In column 11, line 1, in Claim 1, delete "processing unit" and insert -- CPU --, therefor.

In column 11, line 2, in Claim 1, delete "processing unit" and insert -- CPU --, therefor.

In column 11, line 7, in Claim 1, delete "processing unit" and insert -- CPU --, therefor.

In column 11, line 8, in Claim 1, delete "processing unit" and insert -- CPU --, therefor.

In column 11, line 17, in Claim 1, delete "processing unit" and insert -- CPU --, therefor.

In column 11, line 18, in Claim 1, delete "processing unit" and insert -- CPU --, therefor.

In column 11, line 30, in Claim 2, after "beginning" delete "30".

In column 11, line 39, in Claim 3, delete "processing units" and insert -- CPUs --, therefor.

In column 11, line 48, in Claim 4, delete "processing units," and insert -- CPUs, --, therefor.

In column 11, line 49, in Claim 4, delete "processing units" and insert -- CPUs --, therefor.

UNITED STATES PATENT AND TRADEMARK OFFICE
CERTIFICATE OF CORRECTION

PATENT NO.      : 7,028,219 B2
APPLICATION NO. : 10/302627
DATED           : April 11, 2006
INVENTOR(S)     : Charles Stuart Johnson et al.

It is certified that error appears in the above-identified patent and that said Letters Patent is hereby corrected as shown below:

In column 12, line 17, in Claim 8, delete "processing unit" and insert -- CPU --, therefor.

In column 12, line 18, in Claim 8, delete "processing unit" and insert -- CPU --, therefor.

In column 12, line 18, in Claim 8, after "working" insert -- on --.

In column 12, line 21, in Claim 8, delete "processing units" and insert -- CPUs --, therefor.

In column 12, lines 29-30, in Claim 9, delete "processing units" and insert -- CPUs --, therefor.

In column 12, line 30, in Claim 9, delete "accept" and insert -- except --, therefor.

In column 12, line 30, in Claim 9, delete "unit" and insert -- CPU --, therefor.

In column 12, line 36, in Claim 10, delete "processing units" and insert -- CPUs --, therefor.

In column 12, line 37, in Claim 10, delete "processing units" and insert -- CPUs --, therefor.

In column 12, line 38, in Claim 10, delete "processing unit" and insert -- CPU --, therefor.

In column 12, line 39, in Claim 10, delete "processing units" and insert -- CPUs --, therefor.

In column 12, line 39, in Claim 10, delete "inducing" and insert -- including --, therefor.

UNITED STATES PATENT AND TRADEMARK OFFICE
CERTIFICATE OF CORRECTION

| | |
|---|---|
| PATENT NO. | : 7,028,219 B2 |
| APPLICATION NO. | : 10/302627 |
| DATED | : April 11, 2006 |
| INVENTOR(S) | : Charles Stuart Johnson et al. |

It is certified that error appears in the above-identified patent and that said Letters Patent is hereby corrected as shown below:

In column 12, line 39, in Claim 10, delete "a CPU and" before "volatile".

In column 12, line 41, in Claim 10, delete "monitor," and insert -- monitor; --, therefor.

In column 12, lines 42-43, in Claim 10, delete "processing units" and insert -- CPUs --, therefor.

In column 12, line 43, in Claim 10, delete "unit" and insert -- CPU --, therefor.

In column 12, line 49, in Claim 10, delete "during" and insert -- performing --, therefor.

In column 12, line 50, in Claim 10, delete "as" and insert -- is --, therefor.

In column 12, line 51, in Claim 10, delete "processing unit" and insert -- CPU --, therefor.

In column 12, line 52, in Claim 10, delete "processing unit" and insert -- CPU --, therefor.

In column 12, line 52, in Claim 10, after "working" insert -- on --.

In column 12, line 55, in Claim 10, delete "processing units" and insert -- CPUs --, therefor.

In column 12, line 59, in Claim 10, delete "processing unit" and insert -- CPU --, therefor.

In column 12, lines 59-60, in Claim 10, delete "processing unit" and insert -- CPU --, therefor.

In column 12, line 67, in Claim 11, delete "duster" and insert -- cluster --, therefor.

UNITED STATES PATENT AND TRADEMARK OFFICE
CERTIFICATE OF CORRECTION

PATENT NO. : 7,028,219 B2
APPLICATION NO. : 10/302627
DATED : April 11, 2006
INVENTOR(S) : Charles Stuart Johnson et al.

It is certified that error appears in the above-identified patent and that said Letters Patent is hereby corrected as shown below:

In column 12, line 67, in Claim 11, delete "processing units" and insert -- CPUs --, therefor.

In column 13, line 1, in Claim 11, delete "processing units" and insert -- CPUs --, therefor.

In column 13, line 2, in Claim 11, delete "processing unit" and insert -- CPU --, therefor.

In column 13, line 3, in Claim 11, delete "processing units" and insert -- CPUs --, therefor.

In column 13, line 9, in Claim 11, delete "processing unit" and insert -- CPU --, therefor.

In column 13, line 10, in Claim 11, delete "occurs;" and insert -- occurs: --, therefor.

In column 13, line 12, in Claim 11, delete "processing units" and insert -- CPUs --, therefor.

In column 13, line 14, in Claim 11, delete "processing units" and insert -- CPUs --, therefor.

In column 13, line 16, in Claim 11, delete "inducting" and insert -- including --, therefor.

In column 13, line 21, in Claim 11, delete "processing unit" and insert -- CPU --, therefor.

In column 13, line 22, in Claim 11, delete "processing unit" and insert -- CPU --, therefor.

In column 13, line 27, in Claim 11, delete "processing unit" and insert -- CPU --, therefor.

UNITED STATES PATENT AND TRADEMARK OFFICE
CERTIFICATE OF CORRECTION

| | |
|---|---|
| PATENT NO. | : 7,028,219 B2 |
| APPLICATION NO. | : 10/302627 |
| DATED | : April 11, 2006 |
| INVENTOR(S) | : Charles Stuart Johnson et al. |

It is certified that error appears in the above-identified patent and that said Letters Patent is hereby corrected as shown below:

In column 13, line 28, in Claim 11, delete "processing unit" and insert -- CPU --, therefor.

In column 13, line 33, in Claim 11, after "transaction" delete "30".

In column 13, lines 37-38, in Claim 11, delete "processing unit" and insert -- CPU --, therefor.

In column 13, line 38, in Claim 11, delete "processing unit" and insert -- CPU --, therefor.

In column 13, line 60, in Claim 13, delete "processing units" and insert -- CPUs --, therefor.

In column 13, line 65, in Claim 14, delete "monitor," and insert -- monitor; --, therefor.

In column 14, line 1, in Claim 14, delete "processing units" and insert -- CPUs --, therefor.

In column 14, line 2, in Claim 14, delete "processing units" and insert -- CPUs --, therefor.

In column 14, line 22, in Claim 16, delete "manager," and insert -- manager; --, therefor.

In column 14, line 40, in Claim 18, delete "processing unit" and insert -- CPU --, therefor.

In column 14, line 41, in Claim 18, delete "processing unit" and insert -- CPU --, therefor.

In column 14, line 41, in Claim 18, after "working" insert -- on --.

In column 14, line 44, in Claim 18, delete "processing units" and insert -- CPUs --, therefor.

UNITED STATES PATENT AND TRADEMARK OFFICE
CERTIFICATE OF CORRECTION

PATENT NO.        : 7,028,219 B2
APPLICATION NO. : 10/302627
DATED             : April 11, 2006
INVENTOR(S)       : Charles Stuart Johnson et al.

It is certified that error appears in the above-identified patent and that said Letters Patent is hereby corrected as shown below:

In column 14, lines 53-54, in Claim 19, delete "processing units" and insert -- CPUs --, therefor.

In column 14, line 54, in Claim 19, delete "unit" and insert -- CPU --, therefor.

In column 14, line 60, in Claim 20, delete "duster" and insert -- cluster --, therefor.

In column 14, line 62, in Claim 20, delete "processing units" and insert -- CPUs --, therefor.

In column 14, line 62, in Claim 20, delete "processing unit" and insert -- CPU --, therefor.

In column 14, line 63, in Claim 20, delete "a CPU and" before "a volatile".

In column 14, line 66, in Claim 20, delete "processing units" and insert -- CPUs --, therefor.

In column 14, line 67, in Claim 20, delete "processing unit" and insert -- CPU --, therefor.

In column 15, line 3, in Claim 20, delete "processing unit" and insert -- CPU --, therefor.

In column 15, line 5, in Claim 20, delete "processing units" and insert -- CPUs --, therefor.

In column 15, line 7, in Claim 20, delete "processing units" and insert -- CPUs --, therefor.

In column 15, line 14, in Claim 20, delete "processing unit" and insert -- CPU --, therefor.

In column 15, lines 15-16, in Claim 20, delete "processing unit" and insert -- CPU --, therefor.

UNITED STATES PATENT AND TRADEMARK OFFICE
CERTIFICATE OF CORRECTION

PATENT NO. : 7,028,219 B2
APPLICATION NO. : 10/302627
DATED : April 11, 2006
INVENTOR(S) : Charles Stuart Johnson et al.

It is certified that error appears in the above-identified patent and that said Letters Patent is hereby corrected as shown below:

In column 15, line 21, in Claim 20, delete "processing unit" and insert -- CPU --, therefor.

In column 15, line 22, in Claim 20, delete "processing unit" and insert -- CPU --, therefor.

In column 15, line 31, in Claim 20, delete "processing unit" and insert -- CPU --, therefor.

In column 15, line 31, in Claim 20, delete "processing unit" and insert -- CPU --, therefor.

In column 16, lines 9-10, in Claim 21, delete "processing unit" and insert -- CPU --, therefor.

In column 16, lines 10-11, in Claim 21, delete "processing unit" and insert -- CPU --, therefor.

In column 16, line 11, in Claim 21, after "working" insert -- on --.

In column 16, lines 13-14, in Claim 21, delete "processing units" and insert -- CPUs --, therefor.

In column 16, lines 21-22, in Claim 22, delete "processing units" and insert -- CPUs --, therefor.

UNITED STATES PATENT AND TRADEMARK OFFICE
CERTIFICATE OF CORRECTION

PATENT NO. : 7,028,219 B2
APPLICATION NO. : 10/302627
DATED : April 11, 2006
INVENTOR(S) : Charles Stuart Johnson et al.

It is certified that error appears in the above-identified patent and that said Letters Patent is hereby corrected as shown below:

In column 16, line 22, in Claim 22, delete "unit" and insert -- CPU --, therefor.

Signed and Sealed this

Eleventh Day of August, 2009

David J. Kappos
*Director of the United States Patent and Trademark Office*